(12) United States Patent
Raj et al.

(10) Patent No.: US 6,496,291 B1
(45) Date of Patent: Dec. 17, 2002

(54) OPTICAL SERIAL LINK

(75) Inventors: Kannan Raj, Chandler, AZ (US);
Werner Metz, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 09/690,548

(22) Filed: Oct. 17, 2000

(51) Int. Cl.⁷ .............................................. H04B 10/00
(52) U.S. Cl. ........................ 359/152; 359/173; 359/291
(58) Field of Search .................................. 359/152, 127, 359/129, 130, 173, 291

(56) References Cited

U.S. PATENT DOCUMENTS 5,594,576 A * 1/1997 Sutherland et al. .......... 359/118
6,411,424 B1 * 6/2002 Raj .............................. 359/291

* cited by examiner

Primary Examiner—Kinfe-Michael Negash
(74) Attorney, Agent, or Firm—Trop, Pruner & Hu, P.C.

(57) ABSTRACT

An optical serial link may be formed of an optical transceiver and a reflective wavelength coupler. The coupler may reflect light beams of different wavelengths using an elliptical reflector and a dispersive element.

25 Claims, 4 Drawing Sheets

OPTICAL SERIAL LINK

BACKGROUND

This invention relates generally to an optical serial link for exchanging data between two or more terminals.

The Infini-Band Specification includes a link specification that describes the behavior of a link and specifies the link level operations of devices attached to an Infini-Band fabric. See Infini-Band Specification, available from the Infini-Band Trade Association, 5440 Southwest Westgate Drive, Suite 217, Portland, Oreg. 97221 (Rev. 0.9, 2000). The Infini-Band architecture interfaces to the external world from a host channel adapter (HCA). For example, the HCA may provide communication between the fabric services and one or more central processing units which may, for example provide an Internet server function as one example. The HCA may be linked via a switch to a plurality of input/output ports. Generally, the HCA supports a link with a very high data rate.

An Infini-Band link is bi-directional communication pathway between two connect points within the switching fabric. Conventionally, the link may be formed of a copper cable. A short haul copper interconnect may have a bit rate of 2.5 gigabits per second.

One limitation of a copper link is that its bandwidth does not scale well with additional links. Electrical. interconnects on copper also face a daunting challenge in electromagnetic interference mitigation at very high data rates. This may also raise safety concerns due to increased radiation hazards.

Thus, there is a need for better techniques for implementing optical serial links at very high data rates.

DETAILED DESCRIPTION

Figure 1:
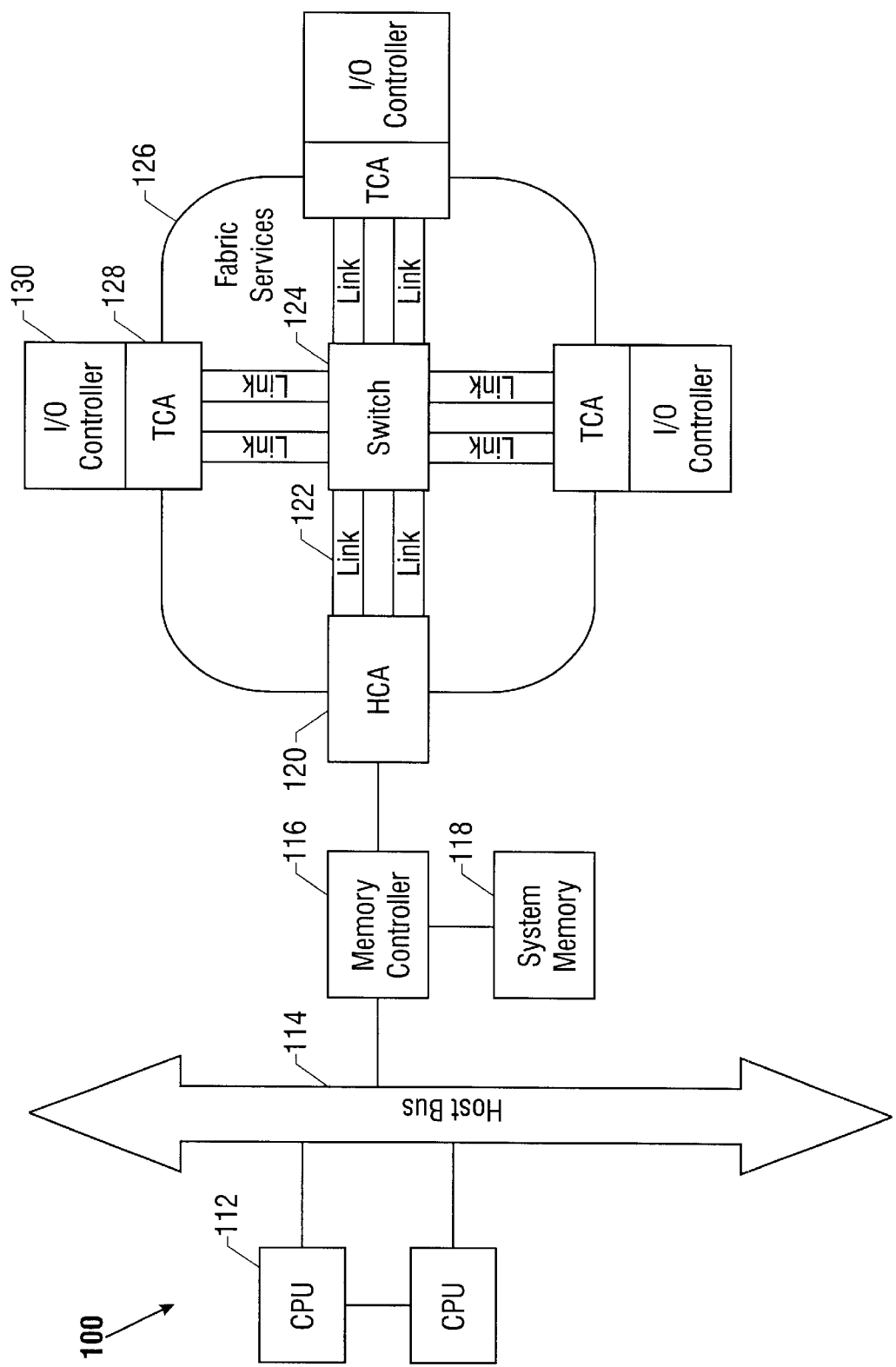
FIG. 1 is a schematic depiction of one embodiment of the present invention.

Referring to FIG. 1, a server or other processor-based device 100 may include a pair of central processing units 112 coupled to a host bus 114. The host bus 114 may in turn be coupled to a memory controller 116. The memory controller controls read and write accesses to the system memory 118. A plurality of input/output devices (not shown) may be coupled to input/output controllers 130. The controllers 130 are coupled to a switch 124 through fabric services 126. The fabric services 126 may include a target channel adapter (TCA) 128 and links 122. Thus, data or commands may be shuttled between a host channel adapter (HCA) 120 and a variety of input/output devices through the I/O controllers 130, TCAs 128, links 122 and switch 124.

In some applications, the data rates may be in excess of 2.5 gigabits per second. The switch 124, link 122 and HCA 120 may be implemented using an optical serial link. While an Infini-Band Specification embodiment is described, the present invention is applicable to optical links in general.

Figure 2:
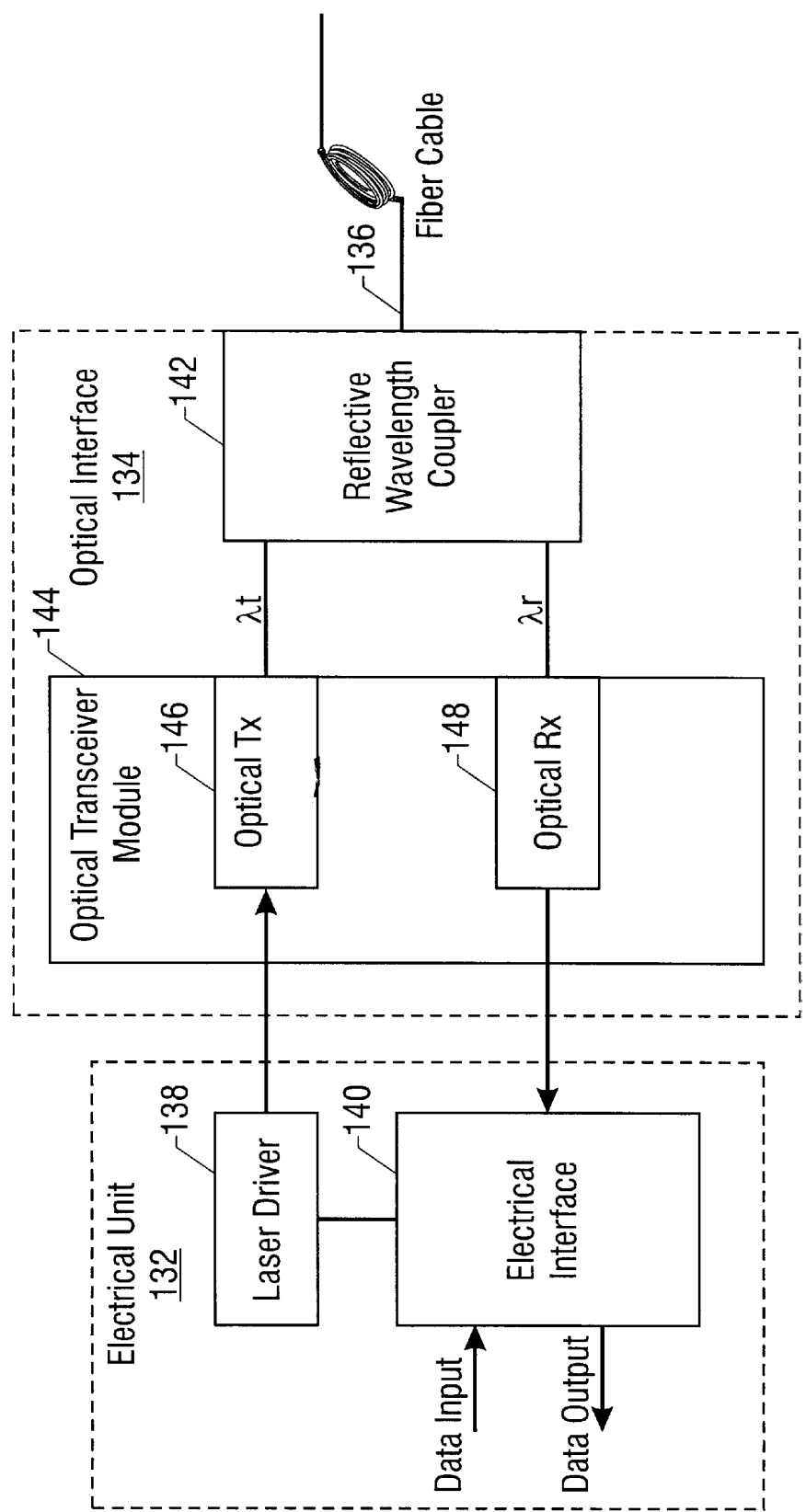
FIG. 2 is schematic depiction of link/switch fabric in one embodiment of the invention.

Referring to FIG. 2, an optical interface 134 and electrical unit 132 may accomplish the functions of the HCA 120, links 122, and switches 124, in one embodiment of the present invention. Thus, a fiber cable 136 may be used to link the HCA with one or more TCAs 128 that in turn couple I/O controllers 130 and I/O devices not shown.

The optical interface 134 may include a reflective wavelength coupler 142 that directly couples to a plurality of optical fibers contained within the fiber cable 136. The reflective wavelength coupler 142 transmits optical signals to the fiber 136 and also may receive signals from the fiber cable 136. The incoming signals are transferred to the optical receiver 148 and outgoing signals are received from the optical transmitter 146. The optical transmitter 146 may for example be a vertical cavity surface emitting laser (VCSEL) or an edge emitting laser diode as two examples.

The transmitter 146 and receiver 148 may be integrated together. In such case, the optical receiver 148 may include an optical detector such as a reverse biased PN junction diode, PIN diode, PNP transistor, or metal-semiconductor-metal (MSM) detector. Monolithic integration of the receiver 148 and transmitter 146 may be accomplished using group III-V materials.

The optical transceiver 144 of the optical interface 134 communicate with an electrical unit 132. The electrical unit 132 powers the optical transmitter 146 using a laser driver 138. The unit 132 also receives optical signals in an electrical interface 140 and converts them into a suitable electrical signal format. Data input and output signals may be received at the electrical interface 140 from the HCA 120. In some cases, the signals may be provided directly to the memory controller 116 shown in FIG. 1.

The fiber arrays 28 and 60 may be integrated with or integrally connected to a reflector system 142 that includes an elliptical reflector 22. Each of the wavelength specific light beams received from one of the fiber arrays 28 or 60 is reflected by the elliptical reflector 22. The light beams that may be received at a foci S1 through S8 of the elliptical reflector 22, are reflected toward corresponding or conjugate focal points S9 through S16 or vice versa. Of course, the number of light beams and the precise orientation of the elliptical reflector 22 is subject to considerable variability. The present invention is not limited to a specific orientation of an elliptical reflector 22 or to the use of a specific number of wavelengths.

In accordance with conventional geometry, any light beam issuing from a focus of the elliptical reflector 22 is reflected to a conjugate focus of the elliptical reflector 22, regardless of the orientation and direction of the light beam. Thus, a one-to-one imaging and coupling may be created between the system 142 issuing the light beams through one set of foci S1 to S8 and the light directed towards the conjugate foci S9 to S16.

A dispersive element 52, such as a reflection phase grating, a thin film dielectric grating, a prism, or micro electromechanical structures (MEMS) contributes to the creation of multiple foci S1 through S16. The dispersive element 52 may be positioned optically between the reflector 22 and an fiber array 28.

Each of the light beams of a different wavelength on a fiber in an array 28 or 60 may be reflected by the reflector 22 from a first plurality of multiple foci S1–S8 towards a second plurality of conjugate foci S9–S16 or vice versa. However, before reaching the second set of conjugate foci, the light beams are reflected by the dispersive element 52 to a common focal point that corresponds to the end of an optical fiber in an array 28 or 60.

A cable 136 including an array 28 or 60 may be made up of dispersion shifted fibers (DSF) or dispersion compensated fibers (DCF) as two examples. Both the DSF and DCF fibers can support high data rates with low attenuation. Each type of fiber may be utilized with a fabric switch 124 or a passive star network. Data may be transmitted at a first wavelength and received at a second wavelength. To prevent cross-coupling of transmitted data due to back reflections from a fiber onto the receive channel and into the optical transmitter 146, an angle polished fiber (APC) may be used. In one embodiment of the present invention, a polish angle of 8° may be suitable.

An optical block 25 may include a substantially transparent block of material. The elliptical reflector 22 may be placed at a predetermined location or locations on the block 25. The block 25 may, for example, be made of borosilicate. The dispersive element 52 may then be patterned on an edge of the optical block 25, in accordance with one embodiment of the present invention or a MEMS 52 may be used.

The block 25 thickness, the dispersive element 52 grating parameters and the ellipticity of the elliptical reflector 22 may be determined by the wavelengths and wavelength spacing. Ray tracing and known grating equation formulations may be used to position these elements. Aligning the optical block 25 to the arrays 28 and 60 and may be facilitated by the use of fiducial marks on the arrays 28 and 60, the optical block 25, and the support 30 for the optical fibers in the arrays 28 or 60.

Figure 5:
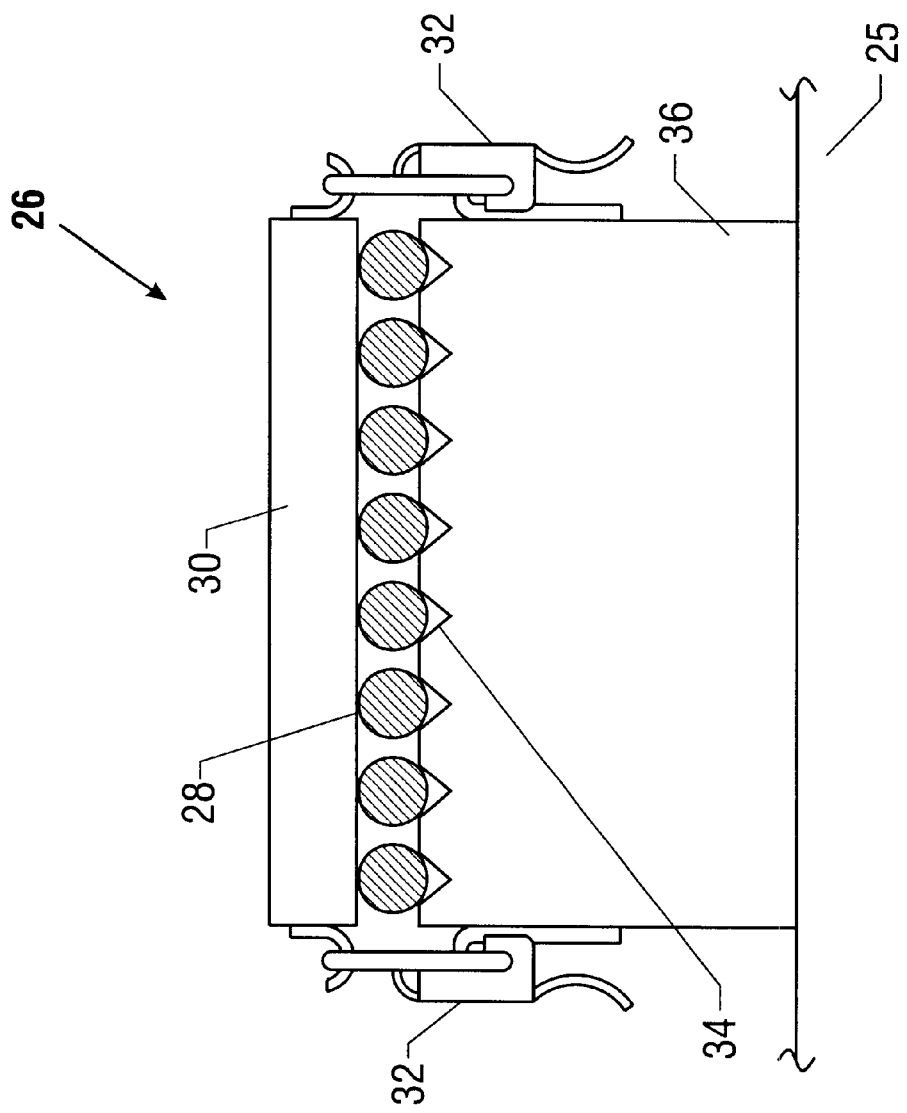
FIG. 5 is an enlarged cross-sectional view taken generally along the line 5—5 of FIG. 3.

The optical block 25 may hold the elliptical reflector 22 and a securement system 26 for the optical fibers in the arrays 28 or 60. As shown in FIG. 5, the securement system 26 includes a top plate 30 clamped to a support 36 by a pair of securement devices 32 that may be clamps as one example. Each securement device 32 engages the top plate 30 and pulls it downwardly causing an optical fiber 28 or 60 to be sandwiched between the top plate 30 and the support 36, in a V-shaped groove 34.

The V-shaped groove 34 may be etched into the surface of the support 36. The support 36 may be made of silicon or thermo-plastic material as examples. The x and y alignment of each fiber in the array 28 or 60 is controlled by placing each fiber 28 on a V-shaped groove 34. The V-shaped groove 34 is centered in alignment with the conjugate foci S1–S16 relative to the dispersive element 24. The height of the V-shaped groove 34 is compatible with the diameter of the optical fiber in each array 28 or 60 to be coupled.

The optical block 25 provides for accurate location of the fibers in each array 28 and 60. Additionally, the reflector 22 is held by the optical block 25 so that the major axis of the reflector 22 is coincident with the laser light input and the minor axis is perpendicular to the midpoint of the foci. The optical block 25 may include a pair of mating halves in some embodiments. The optical block 25 may also provide a stop or end point for accurately positioning the end of the optical fiber.

The elliptical reflector 22 may be a reflective ellipsoid or conic section placed on one side of the optical block 25. The reflector 22 may be secured with adhesive to the optical block 25. The elliptical reflector 22 may be made by replication of a diamond turned master or by injection molding to manufacture in high volumes. Aluminum, silver, or gold coating, as examples, may be applied to the reflector 22 to create a highly reflecting surface. While fixed positioning of the elliptical reflector 22 is illustrated in FIG. 1, the reflector 22 may be adjustable for precise alignment of the reflector 22 with the dispersive element 52 and the fiber arrays 28 and 60.

The coupler 142 may include a plurality of micro-electromechanical structures (MEMS) acting as the element 52. Each of the structures forming the element 52 pivots around at least one (if not more) axes. In the illustrated embodiment, each MEMS element 52 may be tilted outwardly at the top, outwardly at the bottom or be maintained relatively untilted to vary the angle of reflection of light beams reflected by the reflector 22. The element 52 may be arranged in a one or two dimensional array.

Figures 3, 4:
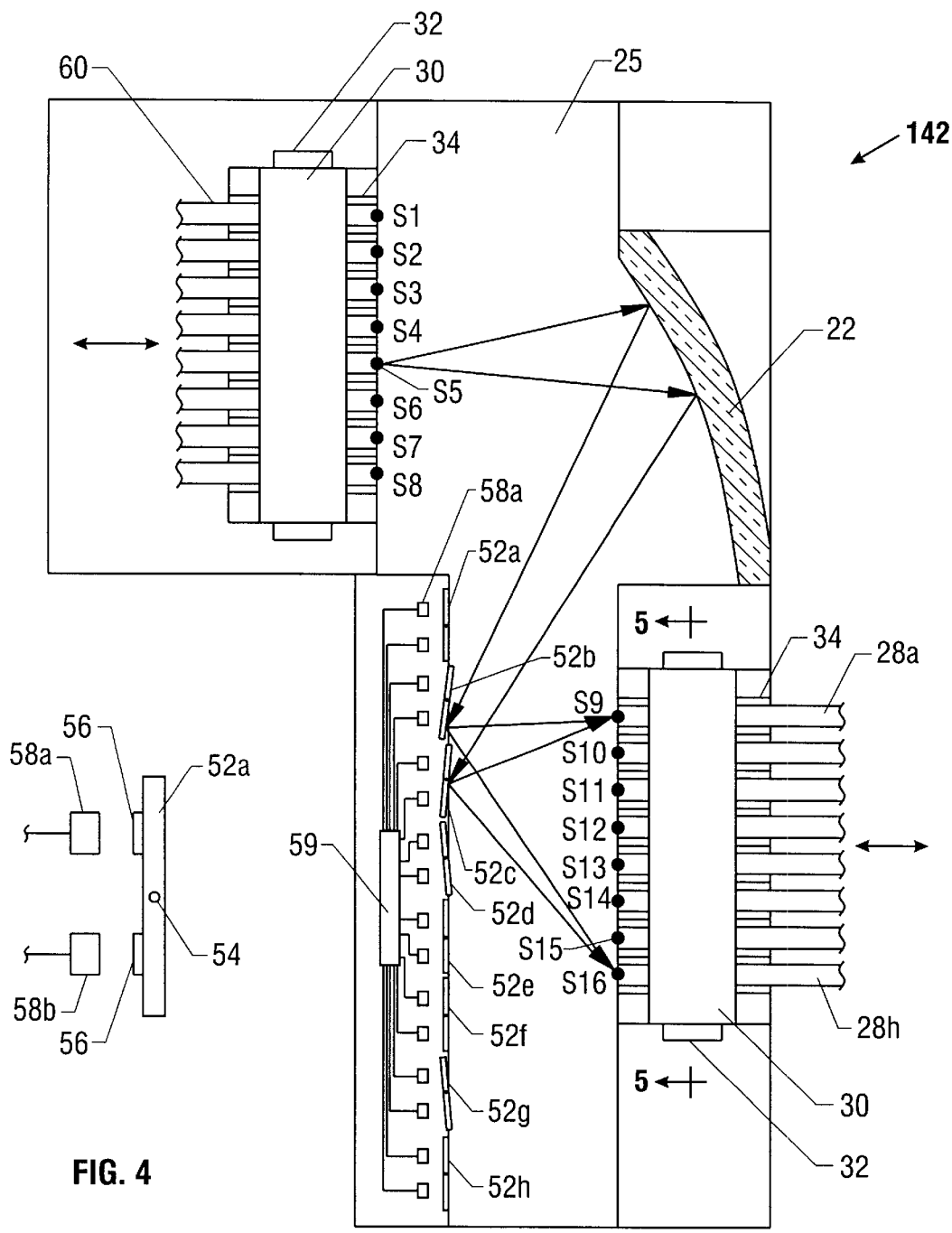
FIG. 3 is a schematic depiction of the reflective wavelength coupler in the embodiment shown in FIG. 2.
FIG. 4 is a schematic depiction of a portion of the embodiment shown in FIG. 3.

Referring to FIG. 4, each MEMS element 52, such as the mirror 52a, includes a pivot 54 that mounts the MEMS element 52 for pivotal rotation under control of two contacts 58a and 58b. Mating contacts 56 are provided on the backside of each MEMS element 52. Thus, by placing appropriate charges on a contact 58a or 58b, the contacts 56a or 56b may be attracted or repelled to adjust the angular orientation of the MEMS element 52. The signals provided to the contacts 58a and 58b may be provided from an integrated circuit 59 that generates signals of appropriate timing to implement user selected combinations of output signals for particular fibers in an array 28 or 60.

Each of the fibers in an array 28 or 60 may be mounted on V-shaped grooves and held between a top plate 30a and support 36 by clamps 32. Thus, a plurality of grooves 34 hold a plurality of output fibers 28, 60 clamped between a top plate 30 and a support 36. In this way, the focal point of any given fiber 28 or 60 may be the target of a particular MEMS element 52 whose position is controlled by the integrated circuit 59.

Each of the free ends of the fibers in the array 60 (eight of which are shown in FIG. 3) define a focus of a elliptical reflector 22 also secured to the optical block 25. The reflector 22 reflects light from each and every one of the fibers in the array 60 towards a MEMS element 52 including a plurality of mirrors 52a in a number equal to the number of fibers. In other words, each fiber in the array 60 has a corresponding mirror 52a through 52h assigned to it. Thus, each fiber controls or routes each output signal from a given fiber to a given output fiber 28a through 28h in one embodiment. The output fibers 28 also include a securement system including the clamps 32, the V-shaped grooves 34 and the top plate 30, which together collectively secure a plurality of output fibers 28 with their free ends abutted against the optical block 25.

In this way, the ultimate disposition of each channel on each fiber 60 may be controlled by the MEMS element 52 to specifically direct or route each input channel to a particular output fiber 28. This arrangement allows shifting of a group of wavelengths on one set of channels to another set of channels while adding or dropping one or more channels in a selective manner. A relatively high precision, compact arrangement is possible in some embodiments.

While the mirrors 52a–h are shown in a one dimensional arrangement, two dimensional arrays of MEMS may also be utilized in some embodiments. By integrating the system 142 with the other components, relatively compact and potentially low loss arrangements are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An optical serial link comprising:
   a first and a second optical fiber array;

an elliptical reflector optically aligned with said arrays;

a dispersive element aligned with said elliptical reflector to reflect a light beam from the first to the second optical fiber array; and an optical transceiver optically coupled to one of said arrays.

2. The link claim 1 including a support that supports said elliptical reflector and dispersive element as a unit.

3. The link of claim 2 wherein said support includes an optical block that optically couples said elliptical reflector and said dispersive element.

4. The link of claim 3 wherein said optical block is a transparent solid block of material.

5. The link of claim 4 including a securement system for securing an output fiber in said second array to said support.

6. The link of claim 5 wherein said securement system is arranged to align an end of an optical fiber with said focal point.

7. The link of claim 1 wherein said dispersive element is aligned to deflect a plurality of beams of different wavelengths onto a single fiber.

8. The link of claim 1 wherein said dispersive element is a micro-electromechanical structure including a plurality of mirrors.

9. The link of claim 8 wherein said beams are directed to at least two different focal points by said micro-electromechanical structure.

10. The link of claim 9 wherein said micro-electromechanical structure includes a plurality of mirrors whose angle of tilt is selectively controllable.

11. A method comprising:

receiving an electrical signal;

converting said electrical signal into a light beam;

reflecting said light beam from an elliptical reflector; and reflecting said light beam from said elliptical reflector towards an optical fiber.

12. The method of claim 11 including reflecting said light beams from said elliptical reflector to at least two focal points.

13. The method of claim 11 further including securing an optical fiber having an end and securing said end at said focal point.

14. The method of claim 13 including securing said optical fiber in a V-shaped groove and clamping said fiber in said V-shaped groove.

15. The method of claim 11 wherein reflecting said beams from said elliptical reflector includes reflecting said beams using a micro-electromechanical structure including a plurality of mirrors.

16. The method of claim 15 including reflecting said beams from said elliptical reflector to a plurality of focal points.

17. The method of claim 16 including aligning an optical fiber at each of said focal points.

18. An optical system comprising:

a host channel adapter;

a target channel adapter; and a serial link coupling said adapters, said link including a reflective wavelength coupler.

19. The system of claim 18 wherein said coupler includes an elliptical reflector that receives a light beam from one of said adapters at a first focus of said reflector and reflects said beam to a second focus on said reflector.

20. The system of claim 18 wherein said coupler includes a micro-electromechanical structure that selectively focuses said beams onto one or more of a plurality of output channels.

21. The system of claim 20 including a controller and said structure includes a plurality of mirrors, said controller controls the orientation of said mirrors in said micro-electromechanical structure to select the output channel for each of said beams.

22. The system of claim 18 wherein said serial link includes an optical transmitter and an optical receiver coupled to said reflective wavelength coupler.

23. The system of claim 22 wherein said transmitter and said receiver are integrated into the same module.

24. The system of claim 23 wherein said optical receiver is coupled to an electrical interface that converts optical signals to electrical signals.

25. The system of claim 24 wherein said electrical interface is coupled to a processor-based system.

* * * * *